US010592612B2

(12) United States Patent
Bostick et al.

(10) Patent No.: US 10,592,612 B2
(45) Date of Patent: Mar. 17, 2020

(54) SELECTIVE TOPICS GUIDANCE IN IN-PERSON CONVERSATIONS

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 322 days.

(21) Appl. No.: 15/481,515

(22) Filed: Apr. 7, 2017

(65) Prior Publication Data
US 2018/0293224 A1  Oct. 11, 2018

(51) Int. Cl.
*G06F 17/27* (2006.01)
*G10L 15/18* (2013.01)
*G06K 9/00* (2006.01)

(52) U.S. Cl.
CPC ........ *G06F 17/279* (2013.01); *G10L 15/1822* (2013.01); *G06K 9/00302* (2013.01); *G06K 9/00885* (2013.01)

(58) Field of Classification Search
CPC ........ G06F 17/279; G06G 17/27; G10L 15/22
See application file for complete search history.

(56) References Cited

U.S. PATENT DOCUMENTS

| | | | | |
|---|---|---|---|---|
| 7,788,087 | B2* | 8/2010 | Corston-Oliver | G06F 16/355 |
| | | | | 704/9 |
| 8,321,361 | B1* | 11/2012 | Heath | G06Q 10/10 |
| | | | | 706/45 |
| 8,676,937 | B2 | 3/2014 | Rapaport et al. | |
| 9,241,015 | B1* | 1/2016 | Villalobos | H04L 65/403 |
| 9,329,677 | B2* | 5/2016 | Chien | G06F 3/04815 |
| 9,330,174 | B1* | 5/2016 | Zhang | G06F 16/95 |
| 9,514,198 | B1* | 12/2016 | Haugen | G06Q 50/01 |

(Continued)

FOREIGN PATENT DOCUMENTS

WO    2009041982 A8    9/2007

OTHER PUBLICATIONS

Anonymous, Method and system to automatically prevent social network system users from exchanging inappropriate content, Feb. 27, 2013.

(Continued)

*Primary Examiner* — Paras D Shah
(74) *Attorney, Agent, or Firm* — Garg Law Firm, PLLC; Rakesh Garg; James Nock

(57) ABSTRACT

Social data of a conversation partner is analyzed who is physically situated relative to a user to have an in-person conversation with the user. From the analysis, a list of topics and a sentiment corresponding to each topic on the list of topics are computed. An evaluation is made that a first value of a first sentiment corresponding to a first topic in the list of topics exceeds a threshold. The user is provided a notification about the first topic and the first sentiment, causing the user to discuss the first topic with the partner in the in-person conversation. When a second topic has a second sentiment below the threshold, the user is caused to drop the second topic from the in-person conversation.

19 Claims, 5 Drawing Sheets

(56) References Cited

U.S. PATENT DOCUMENTS

| | | | |
|---|---|---|---|
| 10,366,168 B2* | 7/2019 | Wu | G06N 20/00 |
| 2005/0256905 A1 | 11/2005 | Gruhl et al. | |
| 2007/0214097 A1 | 9/2007 | Parsons et al. | |
| 2010/0228777 A1* | 9/2010 | Imig | H04L 12/1818 |
| | | | 707/772 |
| 2012/0110071 A1* | 5/2012 | Zhou | G06Q 10/10 |
| | | | 709/204 |
| 2015/0046371 A1* | 2/2015 | Leary | G06Q 30/0282 |
| | | | 705/347 |
| 2015/0170084 A1* | 6/2015 | Byron | G06Q 10/06316 |
| | | | 705/7.26 |
| 2015/0193482 A1* | 7/2015 | Kaushansky | G06F 16/35 |
| | | | 707/741 |
| 2015/0358764 A1* | 12/2015 | Piemonte | G06F 16/29 |
| | | | 455/456.3 |
| 2016/0128617 A1* | 5/2016 | Morris | G06Q 10/103 |
| | | | 434/236 |
| 2016/0180737 A1* | 6/2016 | Clark | G09B 19/00 |
| | | | 434/236 |
| 2016/0321401 A1* | 11/2016 | Buil | G06F 19/3418 |
| 2017/0060839 A1* | 3/2017 | Kawamura | G10L 25/63 |
| 2017/0097928 A1* | 4/2017 | Davis Jones | H04L 67/306 |
| 2017/0352123 A1* | 12/2017 | Kumar | G06F 16/9537 |
| 2018/0075848 A1* | 3/2018 | Naito | G10L 15/1815 |
| 2018/0181572 A1* | 6/2018 | Guo | G06F 16/951 |
| 2019/0005027 A1* | 1/2019 | He | G06N 20/00 |

OTHER PUBLICATIONS

Anonymous, An environment-aware Online application (social network, chat) based on face classification, Jun. 13, 2013.

Anonymous, Method and System for Initiating a Conversation between Users through a Computer Agent based on Profile and Interests of the Users, Sep. 9, 2015.

* cited by examiner

US 10,592,612 B2

SELECTIVE TOPICS GUIDANCE IN IN-PERSON CONVERSATIONS

TECHNICAL FIELD

The present invention relates generally to a method, system, and computer program product for assisting a user avoid undesirable topics in a face-to-face conversation. More particularly, the present invention relates to a method, system, and computer program product for selective topic guidance in in-person conversations.

BACKGROUND

Hereinafter, and unless expressly distinguished where used, any reference to a conversation or an interaction of one user with one or more other users (a conversation partner, partner) refers to a communication occurring between the user and one or more partner, where the user and a partner are human individuals having a person-to-person (in-person) conversation without using any electronic medium for accomplishing the communication.

People find themselves speaking to other people on a one-on-one basis, in a one-to-many situation, or as a group. In many cases, the other person or people (partner/partners) in such a conversation are acquaintances of a person (user).

Individuals have preferences about the topics they would like to discuss with acquaintances and topics that they would not. Such preferences can be general and rarely changing on some topics, dynamic and frequently changing for some other topics based on a variety of factors, and can have other degrees of variations for other topics as well. Some factors affecting a person's desire to discuss a topic with an acquaintance can include, for example, experiences related to the topic in the recent past or distant past, sensitivity or suitability of the topic itself in view of current activities, general interest or disinterest, opinion of others relative to the topic, familiarity or the nature of a relationship with a person or group with whom the topic is to be discussed, and many others.

In a conversation with a partner, it is generally desirable to discuss a topic that the partner would like to discuss. Stated another way, it is desirable for a user to include in a conversation with a partner only those topics for which the partner would not have a preference to avoid or dislike at the time of the conversation.

SUMMARY

The illustrative embodiments provide a method, system, and computer program product. An embodiment includes a method that analyzes, social data of a partner, the partner being physically situated relative to a user to have an in-person conversation with the user. The embodiment computes, responsive to the analyzing, a list of topics and a sentiment corresponding to each topic on the list of topics. The embodiment evaluates that a first value of a first sentiment corresponding to a first topic in the list of topics exceeds a threshold. The embodiment provides, to the user, a notification about the first topic and the first sentiment, the providing causing the user to discuss the first topic with the partner in the in-person conversation. The embodiment causes, responsive to a second topic having a second sentiment below the threshold, the user to drop the second topic from the in-person conversation.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
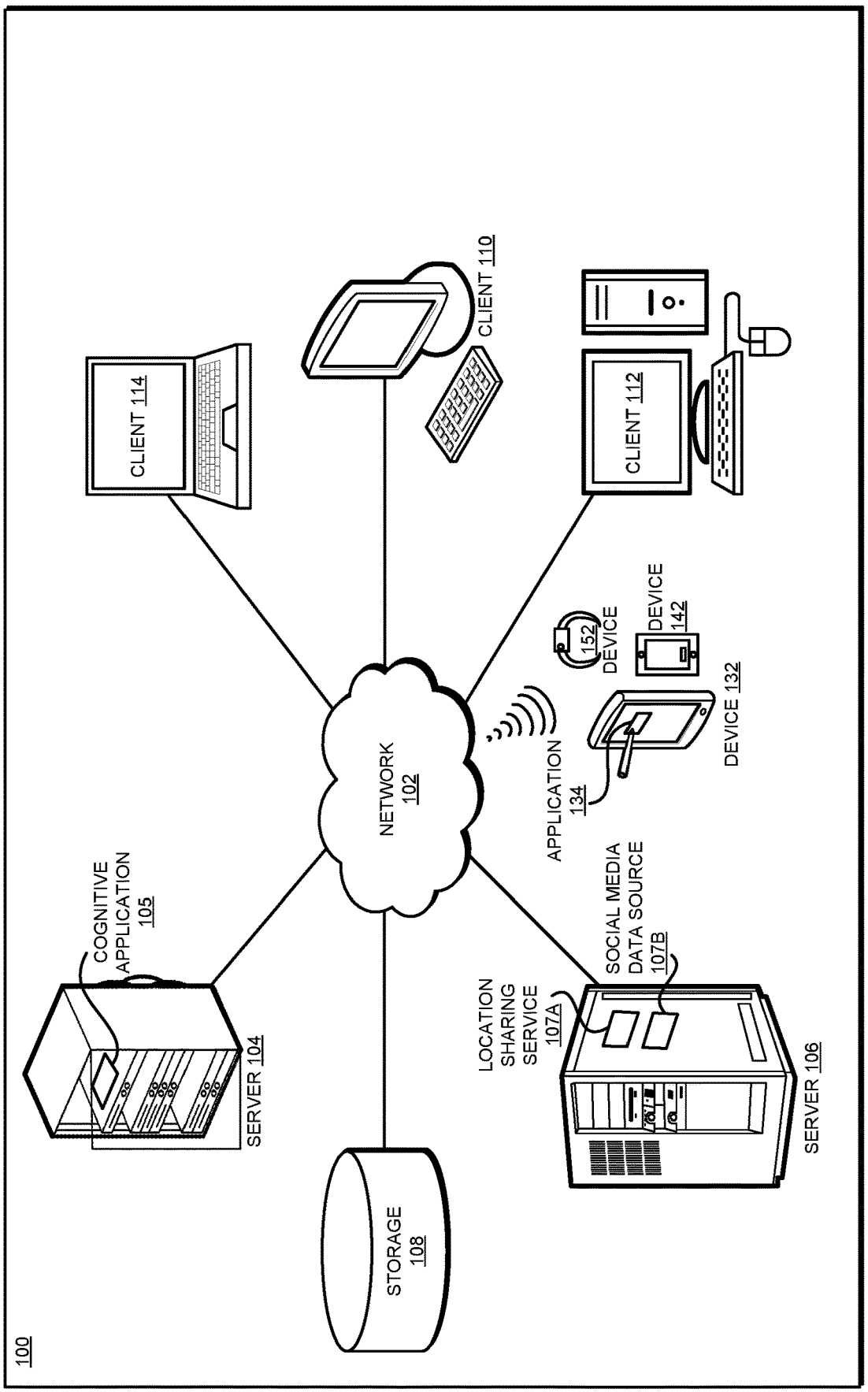
FIG. 1 depicts a block diagram of a network of data processing systems in which illustrative embodiments may be implemented.

Several embodiments are described herein using an example one user-to-one partner conversation only for the clarity of the description and not as a limitation of the illustrative embodiments. An embodiment described herein can easily be adapted and used where one or more users are engaged in a conversation with one or more partners, and such adaptations are contemplated within the scope of the illustrative embodiments.

The illustrative embodiments recognize that knowing which topics are ok to discuss and which are not with a partner is a difficult problem for a number of reasons. For example, first, people generally do not want to talk about what they do not want to talk about, making it difficult to know what they do not want to discuss. Second, people also generally do not often come out and say what they do want to talk about, making it difficult to know what topics are ok to discuss. Third, it happens quite often that a topic that was desirable to discuss earlier has now, for some reason, become a topic that is not desirable to discuss, making desirable topics of conversation a moving target at the time of the conversation.

The illustrative embodiments further recognize that a user often discovers that a topic should be avoided with a particular conversation partner—either in an individual conversation with the partner or in a group that includes the partner—after the topic has already been broached, and the partner has been made uncomfortable.

Alternatively, the user has to be overcautious and discuss only the generally known non-controversial topics with which reasonable partners should not have any issues. The illustrative embodiments recognize that the conversations that are carried out with extreme cautiousness are generally unsatisfactory or insufficient in many circumstances, and make for only polite meaningless conversations, as between strangers, in most cases.

The illustrative embodiments recognize that accidental broaching of partner-specific undesirable topics, and over-cautious selection of benign topics are both undesirable alternatives for conversations between a user and a partner who know each other as friends, family, or in other social relationships. Similarly, the illustrative embodiments recognize that knowing partner-specific topics that are desirable by the partner at a given time, e.g., the time of the conversation, can improve the experience and outcome of the conversation.

Generally, a solution is needed for knowing partner-specific desirable and undesirable topics, the degree of desirability or undesirability associated with a topic, dynamically at the time of a conversation. Furthermore, people form, and change, their opinions about certain topics as a conversation about the topic progresses. Accordingly, a solution is also needed that can provide guidance as a conversation progresses, to continue discussing a current topic, drop a current topic, or alter a list of desirable and undesirable topics.

The illustrative embodiments recognize that the presently available tools or solutions do not address these needs or provide adequate solutions for these needs. The illustrative embodiments used to describe the invention generally address and solve the above-described problems and other problems related to selective topic guidance in in-person conversations.

An embodiment can be implemented as a software application. The application implementing an embodiment can be configured as a modification of an existing cognitive system, as an application executing in a data processing system communicating with an existing cognitive system over a network, as a standalone application, or some combination thereof.

A user has a social network of partners. Often, information about such a social network is available from a social media data source. Partners contribute data to social media and otherwise participate in social media interactions, such as through messages, posts, tweets, likes, shares, and other methods. Social data includes information about a user's social network, contribution or participation data of a partner in the user's social network, or both.

Users in some social network with partners can also share their location with each other. For example, many social media platforms allow users to enable location capabilities which can be shared with members of their social network. The location information shared in this manner can be latitude and longitude information, range or distance information, area of presence information, and generally location information available in any suitable form.

An embodiment operates in a device associated with a user. The embodiment uses an available location sharing method to detect the presence of a partner within a proximity distance. The partner is a member of the social network of the user. The proximity distance is a distance threshold that can be set by the user or can be a characteristic of a location sensing apparatus used by the embodiment. An embodiment determines that a potential for a conversation between the user and a partner exists when the partner is within the proximity distance of the user.

When a partner is within the proximity distance, the embodiment obtains the social data of the partner from a social media data source. In one embodiment, a cognitive system is implemented within the device. In another embodiment, the cognitive system is accessible to the embodiment from the device and over a data network, e.g., when the cognitive system is remotely operating on a server.

A cognitive system is an artificial intelligence application executing on data processing hardware. Cognitive systems are in a category of technologies that uses natural language processing and machine learning to enable people and machines to interact more naturally to extend and magnify human expertise and cognition. These systems learn from an available body of knowledge (knowledgebase) and answer questions and queries pertaining to the subject-matter domain of the knowledgebase by analyzing the relationships and significant aspects that are expressed in or inferable from the knowledgebase. For example, a knowledgebase of a domain can include structured repository of domain-specific information, such as ontologies, or unstructured data related to the domain, or a collection of natural language documents about the domain.

A cognitive system can also use deep learning and other cognitive techniques to perform sentiment analysis on a given information input. For example, the sentiment analysis can analyze and extract a linguistic tone of the information input, a like or dislike and a degree thereof expressed in the information input, a main subject or a topic being discussed or described in the information input, and many other language-based features of the information input. The information input is human-usable natural language input, such as a natural language text, audio of a human speech, a video or an image of human facial expressions or other bodily gestures, and the like.

The embodiment uses the cognitive system implementation to analyze the social data of the partner. The analysis identifies a set of topics related to the conversations or participations of the partner in the social data. The analysis also computes a degree of liking expressed towards each such topic in those conversations or participations of the partner. The analysis also computes a confidence level for each topic and the associated degree. As one example, the confidence in a recently discussed topic (within a threshold period in the past) can be higher than a confidence in a topic that was discussed in a distant past (earlier than the threshold period in the past). As another example, the confidence in an extensively discussed topic (more than a threshold amount of data on the topic) can be higher than a confidence in a topic that was sparingly discussed (less than the threshold amount of data on the topic). As another example, the confidence in an actively discussed topic (partner contributed to the topic) can be higher than a confidence in a topic that was passively discussed (partner simply viewed or otherwise interacted with the topic without contributing data). The confidence values can be determined based on these and many other factors, or some combination thereof.

Similarly, the various degrees of liking towards various topics can similarly be determined using these example factors, other factors, or some combination thereof. For example, an extensively discussed topic can indicate a higher degree of liking for the topic as compared to a topic that was sparingly discussed (less than the threshold amount of data on the topic). As another example, fewer instances of an unfavorable tone towards a topic as compared to favorable tones towards topic can indicate a higher degree of liking than disliking. As another example, an active contribution to a topic as compared to a passive observance of the topic can indicate a higher degree of liking than disliking.

Thus, an embodiment constructs a list of topics with the corresponding degree of liking (or desirability) and a confidence in the computed topic and the degree. When the user is expected to engage more than one partners in a conversation, a topic that may be desirable to one partner may not be desirable to another partner in the group. In such cases, the embodiment aggregates the different lists corresponding to the different partners to compute an aggregate list.

As one example, one embodiment performs the aggregation by determining whether a fraction of the group greater than a threshold fraction finds a topic desirable at least up to a threshold degree. If so, the embodiment includes the topic in the aggregate list, otherwise the embodiment excludes the topic from the aggregate list.

As another example, another embodiment performs the aggregation by determining whether a designated partner in the group finds a topic desirable at least up to a threshold degree. If so, the embodiment includes the topic in the aggregate list, otherwise the embodiment excludes the topic from the aggregate list.

These examples of selecting topics, computing the degrees, and computing the confidence values are not intended to be limiting. From this disclosure, those of ordinary skill in the art will be able to conceive many other methods and factors for accomplishing the same, and such methods and factors are contemplated within the scope of the illustrative embodiments.

An embodiment notifies the user that an aggregate list is available for a group, or a list is available for a partner, as the case may be. The notification can take any suitable form, including but not limited to displaying the list on a display device, presenting the list audibly or haptically, or using some combination of these and other presentation techniques.

The user engages the partner or the group in a conversation, preferably using a topic from the list. During the conversation, an embodiment listens to the audio of the conversation passively. Passive listening comprises capturing at least the audio of the conversation without intruding in the conversation. As a part of passive listening, one embodiment further captures facial expressions, gestures made using parts of the body, or some combination thereof, using an image capturing component, such as a camera, that is pointed towards the partner or the group.

The embodiment analyzes the captured data from the passive listening. In one embodiment, the analysis performed on the passive listening data is the same or similar to the analysis performed on the social data of the partner, as described herein. The analysis of the passive listening data can provide an additional or different topic with an acceptable degree of desirability, a change in a degree of desirability of an existing topic on the list, remove a topic existing on the list, or some combination thereof. Generally, the analysis of the passive listening data can dynamically change the list (or aggregated list) during the conversation depending on how the conversation is progressing.

One embodiment is further enabled with biometric measurements. For example, biometric information of the user can be sensed using a suitable biometric sensor coupled with the device where an embodiment is executing. The embodiment analyzes the biometric data to determine whether the user is having a desirable or an undesirable experience from the conversation, and adjust the list accordingly if needed. The biometric analysis can be used as a self-learning tool in one embodiment, where the embodiment learns to better understand the desirability/undesirability of certain topics, on their own, relative to the user, relative to the partner, of some combination thereof.

Another embodiment is further enabled with biometric data of the partner, alone or in combination with biometric data of the user. The biometric data of the partner can be available if the partner is also using a device that is enabled with an embodiment described herein, and the devices of the participants in a conversation are configured to share the biometric data with each other. The biometric data of the partner can be analyzed to determine whether the partner is having a desirable or an undesirable experience from the conversation, and adjust the list accordingly if needed. The biometric analysis can be also used as a self-learning tool in one embodiment, where the embodiment learns to better understand the desirability/undesirability of certain topics, on their own, relative to the user, relative to the partner, of some combination thereof.

The manner of selective topic guidance in in-person conversations described herein is unavailable in the presently available methods. A method of an embodiment described herein, when implemented to execute on a device or data processing system, comprises substantial advancement of the functionality of that device or data processing system in dynamically facilitating an in-person conversation with topics of discussion that are suitable or desirable at the time of the conversation.

The illustrative embodiments are described with respect to certain types of topics, degrees, confidence values, thresholds, lists, aggregations, groups, social networks, social data, notifications, biometrics, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
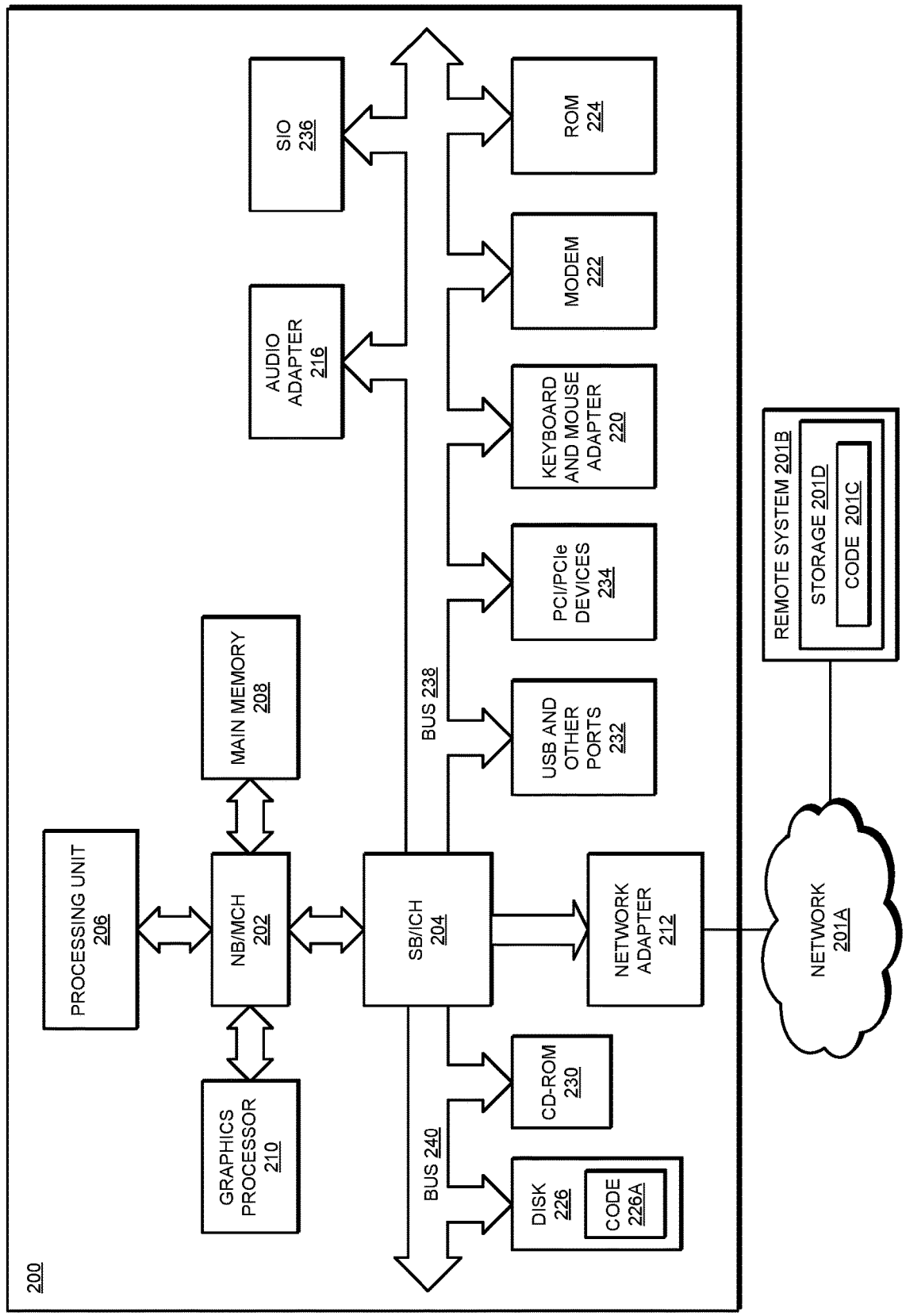
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

When an embodiment can be locally implemented on a user's device to perform all or at least some of the operations described herein, application 134 on device 132 is an example of such an implementation. When at least some of the operations of an embodiment described herein are implemented remotely from user's device 132, such as cognitive analysis, cognitive application 105 is an example of such an implementation. For example, application 105 may provide a remote cognitive analysis service to application 134 in one configuration. Application 134 may be a self-contained system and perform the cognitive analysis locally on device 132 in another configuration contemplated herein. Devices 142 and 152 are some non-limiting example of devices associated with one or more partners whose location can be detected at device 132. Device 132 may be configured with an imaging component (not shown), an audio capturing component (not shown), one or more biometric sensors (not shown). Location sharing service 107A receives location data from device 142 and provide to device 132, and so on. In some embodiments, device 132 can detect device 142 within the proximity distance without using service 107A. Social media data source 107B provides cognitive application 105 or application 134—whichever is implementing the cognitive analysis—with social data of a partner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 and/or 134 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
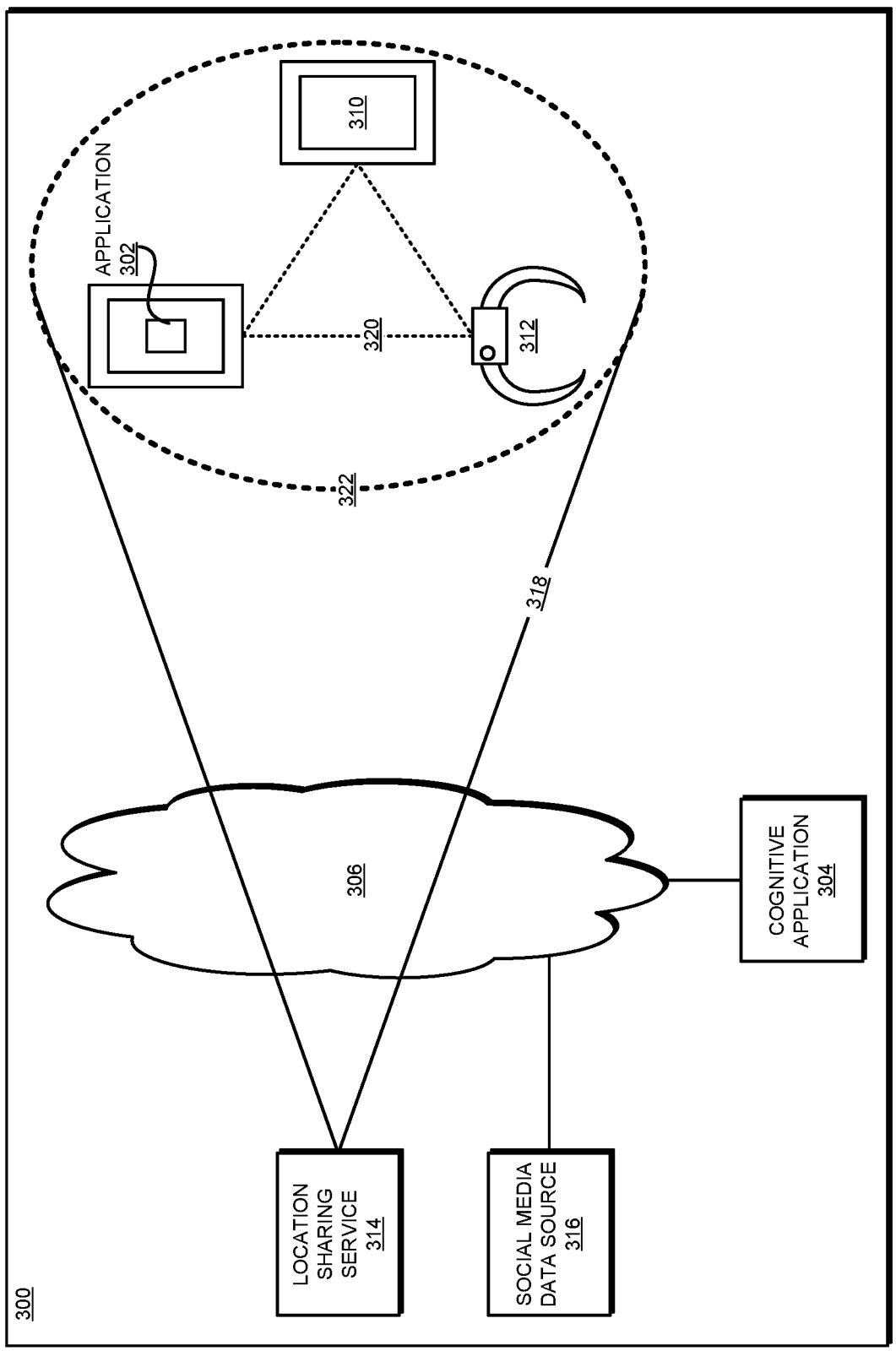
FIG. 3 depicts a block diagram of an example configuration for selective topic guidance in in-person conversations in accordance with an illustrative embodiment.

With reference to FIG. 3, this figure depicts a block diagram of an example configuration for selective topic guidance in in-person conversations in accordance with an illustrative embodiment. Application 302 is an example of application 134 in FIG. 1. As a non-limiting example, suppose that application 302 uses remote cognitive application 304 over network 306 for cognitive analysis.

Device 308 is an example of device 132, device 310 is an example of device 142, and device 312 is an example of device 152, in FIG. 1. Location sharing service 314 is an example of service 107A, and social media data source 316 is an example of source 107B in FIG. 1. Suppose that device 308 is associated with a user and devices 310 and 312 are associated with partners who are in the user's social network. In one embodiment, service 314 collects location information from devices 308, 310, and 312, and makes the location information available to device 308, and possibly other devices as well, as denoted by cone 318. In another embodiment, devices 308, 310, and 312 can communicate with each other and share their location information with each other, as denoted by triangle 320. Devise 308, 310, and 312 are within a proximity distance of one another, as denoted by oval 322.

Source 316 supplies social data of the partner associated with device 142 to cognitive application 304. Cognitive application 304 supplies the topics, degrees of desirability, and confidence values to application 302.

Figure 4:
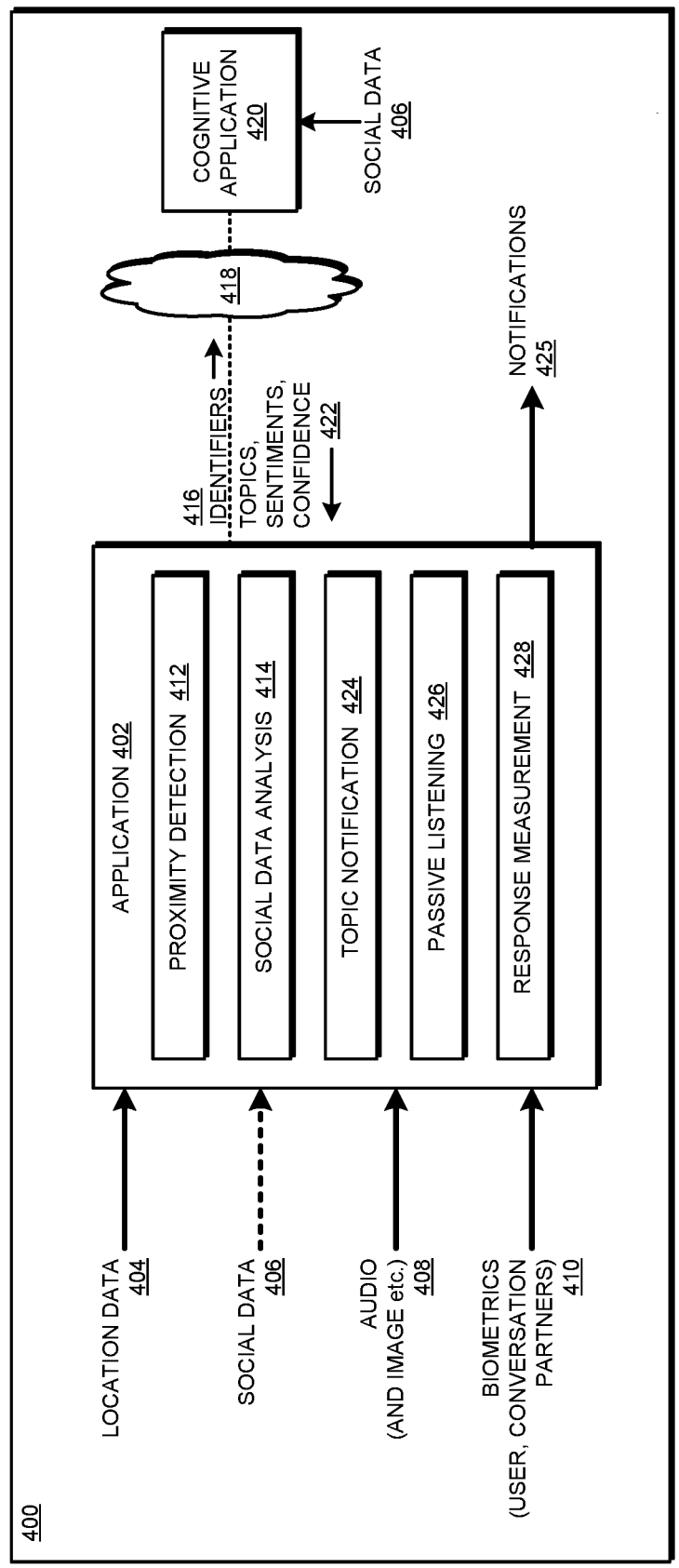
FIG. 4 depicts a block diagram of an example configuration for selective topic guidance in in-person conversations in accordance with an illustrative embodiment.

With reference to FIG. 4, this figure depicts a block diagram of an example configuration for selective topic guidance in in-person conversations in accordance with an illustrative embodiment. Application 402 is an example of application 302 in FIG. 3. Application 402 executes in a device associated with a user, such as in device 308 in FIG. 3.

Location data input 404 provides location of partners (or devices associated with partners) who are in a user's social network. Social data input 406 is social data of such a partner or partners. Input 408 is a passive listening input and can include audio, image, or both types of data captured from an ongoing in-person conversation. Input 410 comprises biometric data of one or more types, for the user, a partner, or both.

Component 412 uses location data input 404 to detect whether one or more partners are in a proximity distance of the device where application 402 is executing. The proximity distance can be set in component 412 in any suitable manner, as described herein.

When application 402 implements local cognitive analysis, component 414 performs the cognitive analysis function using social data input 406. When application 402 uses remote cognitive analysis, component 414 sends the identifiers 416 of the partners identified within the proximity distance over network 418 to remote cognitive application 420. Application 420 is an example of cognitive application 304 in FIG. 3. Cognitive application 420 extracts social data 406 using identifiers 416, and performs the cognitive analysis function using social data input 406.

Remote analysis results in output 422, which includes a collection of topics with corresponding degrees of desirability for a partner, and a confidence value with which the topic and the degree has been computed from social data 406. Several such collections may result if more than one partner is within the proximity distance. When component 414 performs local cognitive analysis, component 414 produces an output similar to output 422.

Component 424 selects one or more topics from the one or more collections of topics. For example, component 424 selects only topics exceeding a threshold degree of desirability, confidence, or both, to form a list. As another example, component 424 may aggregate multiple collections of topics to form an aggregated list as described herein. Component 424 provides notification 425 to the user in any of the manners described herein.

Component 426 collects passive listening input 408. Component 428 uses the analysis of component 414 or cognitive application 420 on input 408, and uses the topic notification function of component 424 based on the topics resulting from such analysis.

Component 428 collects biometric data input 410. Component 428 improves an analysis of component 414 or cognitive application 420 through self-learning, as described herein. Component 428 may also cause the cognitive analysis to consider the biometric responses of the user, a partner, or both, in determining a degree of desirability of a topic.

Figure 5:
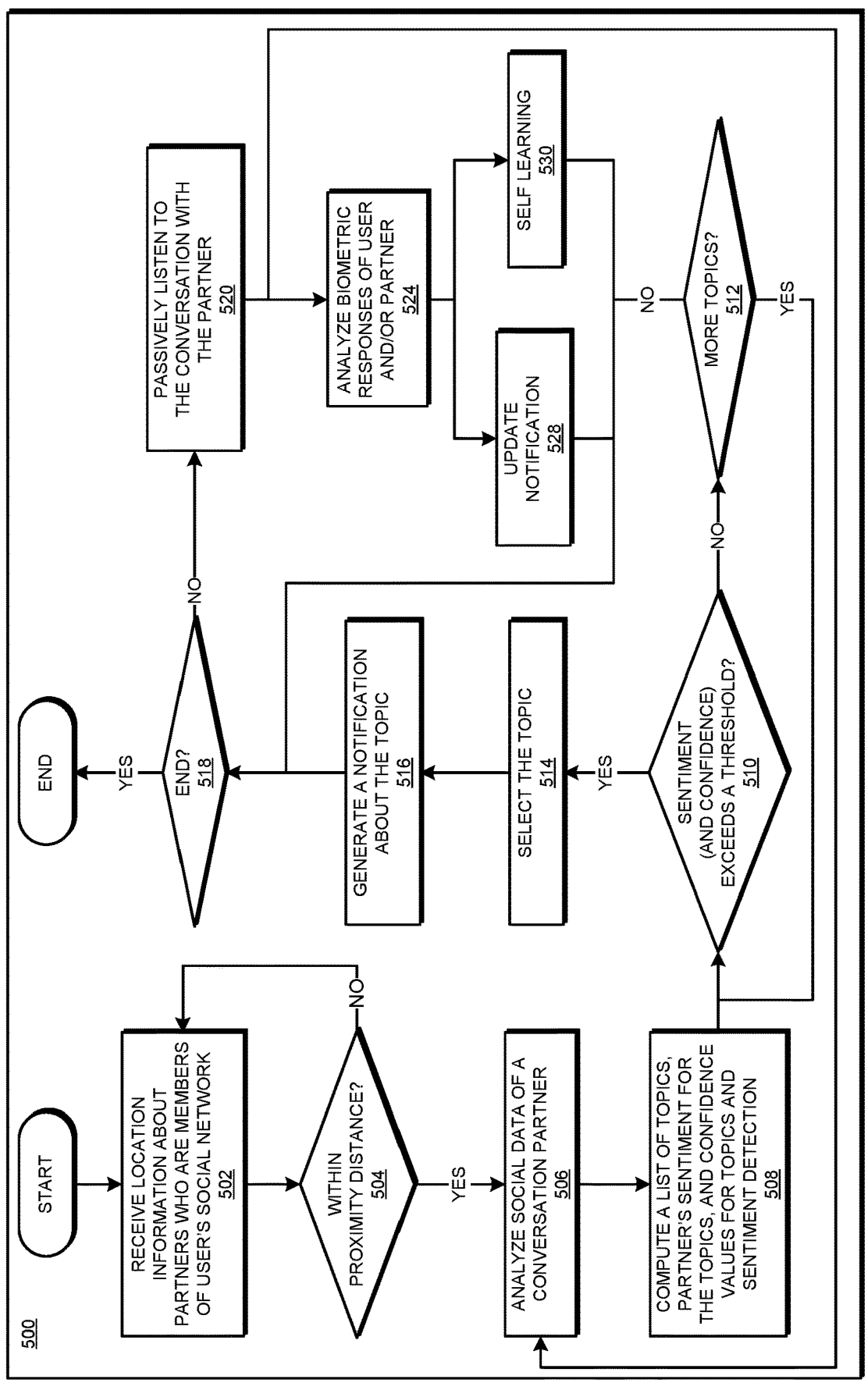
FIG. 5 depicts a flowchart of an example process for selective topic guidance in in-person conversations in accordance with an illustrative embodiment.

With reference to FIG. 5, this figure depicts a flowchart of an example process for selective topic guidance in in-person conversations in accordance with an illustrative embodiment. Process 500 can be implemented in application 402 in FIG. 4.

The application receives location information about partners, the partners being members of a user's social network (block 502). The application determines whether a partner is within a proximity distance (block 504). If no partner is within the proximity distance ("No" path of block 504), the application returns to block 502.

If a partner is within the proximity distance ("Yes" path of block 504), the application analyzes the social data of the partner (block 506). The application computes a list of topics, partner's sentiment (i.e., degree of liking) towards a topic, and a confidence value corresponding to the topics and the sentiment (block 508).

For a topic, the application determines whether the degree of liking, the confidence, or both, exceed their respective thresholds (block 510). If either the degree or the confidence or both are below their respective thresholds ("No" path of block 510), the application determines whether more topics have to be analyzed in a similar manner (block 512). If more topics have to be analyzed ("Yes" path of block 512), the application returns to block 510 with another topic. If no more topics have to be analyzed ("No" path of block 512), the application proceeds to block 518 thereafter.

If the degree or the confidence or both exceed their respective thresholds ("Yes" path of block 510), the application selects the topic for a final list, such as an aggregated list (block 514). The application generates a notification about the selected topic (block 516).

The application determines whether process 500 should end (block 518). If the process should end ("Yes" path of block 518), the application ends process 500 thereafter.

If process 500 should not end ("No" path of block 518), the application passively listens to a conversation with the partner (block 520). The application may fork process 500 into two branches. In the first branch, the application captures the passive listening data and returns to block 506 for analyzing the captured data. In the second path, the application may optionally capture and analyze biometric data of the user, the partner, or both (block 524). Based on the biometric data analysis, the application may update the list of suitable topics from block 514 (block 528). The application may also optionally use the biometric data analysis for self-learning (block 530). The application then returns process 500 to block 518.

Thus, a computer implemented method, system or apparatus, and computer program product are provided in the illustrative embodiments for selective topic guidance in in-person conversations and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
computing, by analyzing a set of social media interactions of a partner, the analyzing using a cognitive system implementation, the partner being physically situated relative to a user to have an in-person conversation with the user, a list of topics;
computing, by analyzing the set of social media interactions, the analyzing using the cognitive system implementation, a value of a degree of liking towards each topic on the list of topics and a confidence value corresponding to the value of each degree of liking, a value of a first degree of liking towards a first topic on the list of topics and a confidence value towards the first degree of liking determined using the recency, amount of data in a social media interaction relating to the first topic, and amount of partner contribution to a social media interaction relating to the first topic;
evaluating that a first value of a first degree of liking corresponding to a first topic in the list of topics exceeds a threshold; and
providing, to a device of the user, a notification about the first topic and the first degree of liking, the providing notifying the user of the desirability of the first topic to the partner in the in-person conversation.

2. The method of claim 1, further comprising:
capturing passive listening data of the in-person conversation;
analyzing the passive listening data to determine that the first topic has a second value of the first degree of liking in the in-person conversation at a time of the in-person conversation;
providing an updated notification about the first topic to the device of the user, the providing notifying the user of the undesirability of the first topic to the partner in the in-person conversation.

3. The method of claim 2, wherein the passive listening data comprises audio of the in-person conversation.

4. The method of claim 2, wherein the passive listening data comprises an image of a physical expression of the partner during the in-person conversation.

5. The method of claim 1, further comprising:
adding the first topic to an aggregated list;
evaluating that a second value of a second degree of liking corresponding to a second topic in the list of topics of the partner exceeds the threshold;
evaluating that a third value of a third degree of liking corresponding to the second topic in the list of topics of a second partner is below threshold, wherein the second partner is also participating in the in-person conversation;
omitting the second topic from the aggregated list, wherein the providing the notification only occurs for topics on the aggregated list;
providing, to a device of the user responsive to a second topic having a second degree of liking below the threshold, a notification about the second topic and the second degree of liking, the providing notifying the user of the undesirability of the second topic to the partner in the in-person conversation.

6. The method of claim 1, further comprising:
analyzing a biometric response, the biometric response comprising biometric data from the user during the in-person conversation;
analyzing the biometric response to determine that the first topic has a second value of the first degree of liking in the in-person conversation at a time of the in-person conversation;
providing an updated notification about the first topic to a device of the user, the providing notifying the user of the undesirability of the first topic to the partner in the in-person conversation.

7. The method of claim 6, further comprising:
receiving a biometric data of the partner, wherein the biometric response further comprises the biometric data of the partner.

8. The method of claim 6, further comprising:
using the biometric response as an additional factor in selecting the first topic in the list of topics.

9. The method of claim 1, further comprising:
extracting from a social media interaction of the partner, the first topic of the social media interaction; and
performing deep analysis of the social media interaction to compute a value of the first sentiment expressed by the partner towards the topic.

10. The method of claim 1, further comprising:
receiving a location information of a second device associated with the partner; and
determining, using the location information, that the partner is within the proximity distance of the user, the in-person conversation being likely between persons within the proximity distance.

11. The method of claim 10, further comprising:
obtaining the location information, as a part of receiving the location information, from a remote location information service.

12. The method of claim 11, further comprising:
obtaining the location information, as a part of receiving the location information, directly from the second device.

13. The method of claim 1, further comprising:
identifying the partner as a member of a social network of the user; and
collecting, from a social media data service, social data of the partner.

14. The method of claim 1, wherein the analyzing the social data is a cognitive analysis operation that occurs locally on the device of the user.

15. The method of claim 1, wherein the analyzing the social data is a cognitive analysis operation that occurs on a remote system accessible from the device of the user.

16. A computer usable program product comprising one or more computer-readable storage devices, and program instructions stored on at least one of the one or more storage devices, the stored program instructions comprising:

program instructions to-compute, by analyzing a set of social media interactions of a partner, the analyzing using a cognitive system implementation, the partner being physically situated relative to a user to have an in-person conversation with the user, a list of topics;

program instructions to compute, by analyzing the set of social media interactions, the analyzing using the cognitive system implementation, a value of a degree of liking towards each topic on the list of topics and a confidence value corresponding to the value of each degree of liking, a value of a first degree of liking towards a first topic on the list of topics and a confidence value towards the first degree of liking determined using the recency, amount of data in a social media interaction relating to the first topic, and amount of partner contribution to a social media interaction relating to the first topic;

program instructions to evaluate that a first value of a first degree of liking corresponding to a first topic in the list of topics exceeds a threshold; and program instructions to provide, to a device of the user, a notification about the first topic and the first degree of liking, the providing notifying the user of the desirability of the first topic to the partner in the in-person conversation.

17. The computer usable program product of claim 16, wherein the computer usable code is stored in a computer readable storage device in a data processing system, and wherein the computer usable code is transferred over a network from a remote data processing system.

18. The computer usable program product of claim 16, wherein the computer usable code is stored in a computer readable storage device in a server data processing system, and wherein the computer usable code is downloaded over a network to a remote data processing system for use in a computer readable storage device associated with the remote data processing system.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to-compute, by analyzing a set of social media interactions of a partner, the analyzing using a cognitive system implementation, the partner being physically situated relative to a user to have an in-person conversation with the user, a list of topics;

program instructions to compute, by analyzing the set of social media interactions, the analyzing using the cognitive system implementation, a value of a degree of liking towards each topic on the list of topics and a confidence value corresponding to the value of each degree of liking, a value of a first degree of liking towards a first topic on the list of topics and a confidence value towards the first degree of liking determined using the recency, amount of data in a social media interaction relating to the first topic, and amount of partner contribution to a social media interaction relating to the first topic;

program instructions to evaluate that a first value of a first degree of liking corresponding to a first topic in the list of topics exceeds a threshold; and program instructions to provide, to a device of the user, a notification about the first topic and the first degree of liking, the providing notifying the user of the desirability of the first topic to the partner in the in-person conversation.

* * * * *